UNITED STATES PATENT OFFICE.

PAUL EHRLICH AND ERNST SCHMITZ, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ARSENOARYLGLYCOLLIC ACIDS.

963,126.  Specification of Letters Patent.  Patented July 5, 1910.

No Drawing.  Application filed May 17, 1909.  Serial No. 496,654.

*To all whom it may concern:*

Be it known that we, PAUL EHRLICH, M. D., professor of medicine, and ERNST SCHMITZ, Ph. D., chemist, citizens of the Empire of Germany, residing at Frankfort-on-the-Main, Germany, have invented certain new and useful Improvements in the Manufacture of Arsenoarylglycollic Acids, of which the following is a specification.

We have found that new compounds, namely arsenoarylglycollic acids, which are valuable as remedies in infectious diseases, can be obtained by treating arylglycolarsinic acids with energetic reducing agents. The reaction involved corresponds to the equation:

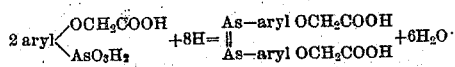

As intermediate products of the reaction arsenoxids may result which, on being further reduced, are transformed into the arseno derivatives.

The arylglycolarsinic acids which are to be reduced may be obtained from the oxyarylarsinic acids by combining them with chloracetic acid, for instance as follows:— 240 grams of sodium para-oxyphenylarsinate, dissolved in 480 grams of water, are mixed with a solution of 188 grams of chloracetic acid in 300 grams of water and with 400 grams of caustic soda lye of 35 per cent. strength. This mixture is boiled for three hours on a reflux apparatus; when cool it is filtered and acidified by means of concentrated hydrochloric acid while well cooling. The phenylglycolarsinic acid then separates and may be recrystallized from water or glacial acetic acid. It crystallizes in the form of small crystals; it sinters when heated to over 150° C. and decomposes; it is soluble in methyl-alcohol and ethyl-alcohol, almost insoluble in ether and benzene; when treated with alkalies it forms readily soluble salts.

The process for producing the new arseno compounds may be illustrated by the following example: 800 grams of anhydrous sodium hydrosulfite and 400 grams of magnesium chlorid are dissolved in 4000 c. cm. of water and mixed with 200 grams of 10-normal caustic soda lye. To the solution, which has been filtered from the magnesium hydroxid, 160 grams of disodium salt of the paraphenylglycolarsinic acid are added and the mixture is heated for about one hour to 45° while stirring well. The precipitate thus formed is filtered off and washed with water; by re-dissolving it in the form of its sodium salt the new compound "arseno-phenylglycollic acid" can be obtained in a pure state. The sodium salt is yellow, readily soluble in water, difficultly soluble in alcohol. The free acid is isolated from it by means of acetic acid as a yellow voluminous precipitate. The acid and its salts reduce a cold ammoniacal silver solution. In an analogous manner other arylglycolarsinic acids, for instance ortho- and meta-tolyl-glycolarsinic acids, can be converted into the corresponding arsenoarylglycollic acids, very similar to the above described arsenophenylglycollic acid.

The therapeutic efficiency of the new arseno compounds consists in destroying trypanosomes bacteria; they are capable of curing even such animals as have been infected with trypanosomes of a very great resistance.

The said new compounds may be administered by injecting a solution of 5 to 10 per cent. strength into the subcutaneous conjunctive tissue. Administration "*per os*" is excluded. According to the present experience, it is best to administer doses of 0.5 grams, which are eventually repeated.

Having now described our invention, what we claim is:—

1. As new products, the arsenoarylglycollic acids the constitution of which corresponds to the formula:

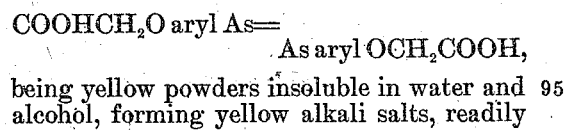

being yellow powders insoluble in water and alcohol, forming yellow alkali salts, readily soluble in water, difficultly soluble in alcohol, and the solutions of which reduce a cold ammoniacal silver solution.

2. As a new product, the arsenophenylglycollic acid, the constitution of which corresponds to the formula:

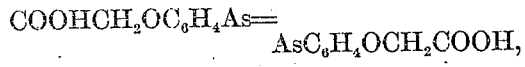

being a yellow powder insoluble in water and alcohol, forming yellow alkali salts, readily soluble in water, difficultly soluble in alcohol, and the solution of which reduces a cold ammoniacal silver solution.

In testimony whereof, we affix our signatures in presence of two witnesses.

PAUL EHRLICH.
ERNST SCHMITZ.

Witnesses:
JEAN GRUND,
CARL GRUND.